US009317456B2

(12) United States Patent
Mallick et al.

(10) Patent No.: US 9,317,456 B2
(45) Date of Patent: Apr. 19, 2016

(54) METHOD AND SYSTEM FOR PERFORMING EVENT-MATCHING WITH A GRAPHICAL PROCESSING UNIT

(75) Inventors: Sudeep Mallick, West Bengal (IN); Murali Krishna Emani, Hyderabad (IN)

(73) Assignee: Infosys Technologies Ltd., Bangalore (IN)

( * ) Notice: Subject to any disclaimer, the term of this patent is extended or adjusted under 35 U.S.C. 154(b) by 378 days.

(21) Appl. No.: 13/024,111

(22) Filed: Feb. 9, 2011

(65) Prior Publication Data

US 2012/0092352 A1    Apr. 19, 2012

(30) Foreign Application Priority Data

Oct. 18, 2010   (IN) .......................... 3054/CHE/2010

(51) Int. Cl.
| | | |
|---|---|---|
| *G06F 13/14* | (2006.01) | |
| *G06T 1/00* | (2006.01) | |
| *G06F 17/30* | (2006.01) | |
| *G09G 5/36* | (2006.01) | |
| *G09G 5/397* | (2006.01) | |

(52) U.S. Cl.
CPC ............... *G06F 13/14* (2013.01); *G06F 17/30* (2013.01); *G06T 1/00* (2013.01); *G09G 5/363* (2013.01); *G09G 5/397* (2013.01); *G09G 2360/08* (2013.01); *G09G 2360/121* (2013.01); *G09G 2360/128* (2013.01)

(58) Field of Classification Search
CPC . G06F 13/14; G06F 2209/5018; G06F 9/542; G06T 1/00; G06G 9/46; G09G 2360/121
USPC .................................. 345/520, 501; 718/102
See application file for complete search history.

(56) References Cited

U.S. PATENT DOCUMENTS

| | | | |
|---|---|---|---|
| 8,103,769 B1 * | 1/2012 | Weiser et al. ................. | 709/225 |
| 8,195,648 B2 * | 6/2012 | Zabback et al. ............... | 707/718 |
| 2009/0262131 A1 * | 10/2009 | Suntinger et al. ............. | 345/619 |
| 2009/0287628 A1 * | 11/2009 | Indeck et al. .................. | 706/47 |
| 2010/0070975 A1 * | 3/2010 | Barker et al. ................. | 718/102 |
| 2010/0110083 A1 * | 5/2010 | Paltashev et al. ............. | 345/506 |
| 2010/0220978 A1 * | 9/2010 | Ogikubo ......................... | 386/95 |
| 2010/0295856 A1 * | 11/2010 | Ferreira et al. ............... | 345/441 |
| 2011/0016132 A1 * | 1/2011 | Okamoto ....................... | 707/747 |
| 2012/0008836 A1 * | 1/2012 | Bobbitt et al. ................ | 382/113 |

OTHER PUBLICATIONS

Farroukh, A. et al., "Parallel Event Processing for Content-Based Publish/Subscribe Systems", Proceedings of the Third ACM International Conference on Distributed Event-Based Systems, DEBS, pp. 1-9 (2009).

(Continued)

*Primary Examiner* — Hau Nguyen
(74) *Attorney, Agent, or Firm* — LeClairRyan, a Professional Corporation (57) ABSTRACT

A computer-implemented method for event matching in a complex event processing system includes receiving, with a computer processing device, a stream of event data; receiving, with a computer processing device, an event list and an access predicate list, wherein the event list includes one or more event data pairs; and identifying, with a graphical processing device, patterns in the stream of event data.

15 Claims, 6 Drawing Sheets

(56) References Cited

OTHER PUBLICATIONS

Schmidt, K. et al., "Blending Complex Event Processing With the RETE Algorithm", CEP2008: 1st International Workshop on Complex Event Processing for the Future Internet Colocated With the Future Internet Symposium FIS2008, vol. 412CEUR Workshop Proceedings CEUR-WS.org, ISSN 1613-0073, (2008).

Progress Software, "An Introduction to Event Processing, Powering Real-Time, Intelligent Business Applications" (2009).
Fabret, F. et al., "Filtering Algorithms and Implementation for Very Fast Published/Subscribe Systems," SIGMOD (2001).
NVIDIA CUDA Programming Guide: Version 1.0, (2007).

* cited by examiner

METHOD AND SYSTEM FOR PERFORMING EVENT-MATCHING WITH A GRAPHICAL PROCESSING UNIT

This application claims the benefit of Indian Patent Application No. 3054CHE/2010, filed Oct. 18, 2010, which is hereby incorporated by reference in its entirety.

BACKGROUND

Complex Event Processing ("CEP") is an event processing concept that deals with the task of processing multiple events (i.e., an event cloud) with the goal of identifying meaningful events within the event cloud. The event cloud may, for example, be an incoming stream of data received by an application and a CEP system may identify complex sequences of events in real-time. CEP systems employ techniques such as detection of complex patterns of events, event correlation and abstraction, event hierarchies, and relationships between events such as causality, membership and timing, and event-driven processes. CEP systems may be used to discover information trends contained in the events happening across all layers in an organization and then analyze an event's impact from a macro level as a "complex event." Thus, action may be take in real-time to respond to the complex event.

CEP is becoming crucial in enterprise-scale applications. However, processing the multitude of events that stream into an enterprise system within the least possible time is a daunting task. Current enterprise-scale applications desire a rate of gigabytes per second ("GB/sec"). Algorithms and systems have aspired to achieve high scalability and high performance but such systems are complex and expensive. The main component of a CEP system is event matching, for example utilizing a correlation engine ("CE") which matches and identifies patterns in the incoming event stream. The CE has to process a large number of events per second and analyze different event processing strategies. Hence, the CE has to provide high scalability, availability, and performance.

Systems and algorithms have been suggested in attempts to achieve high scalability and performance. For example, "Filtering Algorithms and Implementation for Very Fast Publish/Subscribe Systems", by F. Fabret, et al., AMC SIGMOND, 2001, the entire contents of which are incorporated herein by reference, describes filtering algorithms and implementations for a CEP system. "Parallel Event Processing for Content-Based Publish/Subscribe Systems", by A. Farroukh, et al., AMC DEBS 2009, the entire contents of which are incorporated herein by reference, describes a parallel matching engine for a CEP system which leverages chip multi-processors to increase throughput and reduce matching time. The Fabret and Farroukh articles teach similar two-phase algorithms for pattern matching and Farroukh additionally teaches using event parallel processing.

The articles teach a two-phase algorithm for pattern matching of events in a subscription system. According to the algorithm, a predicate P, an access predicate, has to be matched before a set of subscriptions can be satisfied. An action can be taken on an event only if some condition is met. The algorithm defines a subscription as a set of predicates of the form {<attribute name> A, <value> V, <relational operator (e.g., ≤, ≥, =)> R} and an event is defined by a set of {<attribute name> A, <value> V}. Thus, an event is said to match a predicate when A[e]=A[p] and V[e] R V[p]. In the first phase of the algorithm, the algorithm creates a bit vector to keep track of all predicates that are matched by an event and initializes the bit vector to 0. For every event attribute, the algorithm hashes the attribute name to determine the table holding the attribute and the resulting table is accessed. Entries matched by this attribute are then indexed and corresponding bits in the bit vector are set to 1. In the second phase, the list of access predicates is traversed and matched against the bit vector. When an access predicate matches a corresponding bit vector (i.e., the corresponding bit vector position is set to 1), each set of methods is evaluated. If no match is found, no method is processed.

In a CEP system, maximum time and resources are consumed in the matching and processing engine that connects decoupled entities/events. A CEP system can increase throughput of event processing by utilizing a chip-multiprocessor's multiple cores or grid computing to handle these heavy computations in parallel. Still, implementing CEP systems on conventional hardware, such as chip-multiprocessors, using naïve multithreading is expensive and greater event matching speeds are desired.

SUMMARY

According to embodiments, a computer-implemented method for event matching in a complex event processing system includes receiving, with a computer processing device, a stream of event data; receiving, with a computer processing device, an event list and an access predicate list, wherein the event list includes one or more event data pairs; and identifying, with a graphical processing device, patterns in the stream of event data.

According to embodiments, a computing device for implementing a complex event processing system includes a processing device executing instructions; and a graphical processing device configured to receive instructions and a stream of event data from the processing device and to identify patterns in the stream of event data.

According to embodiments, computer readable instructions are stored on a non-transitory storage device, the computer readable instructions configured to be processed by a processor to instruct the processor to perform a method including receiving, with a computer processing device, a stream of event data; receiving, with a computer processing device, an event list and an access predicate list, wherein the event list comprises one or more event data pairs; and identifying, with a graphical processing device, patterns in the stream of event data.

While the method and system for performing event-matching with a graphical processing unit is described herein by way of example and embodiments, those skilled in the art will recognize that the method and system is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a CEP method and system perform event-matching utilizing graphical processing unit ("GPU") hardware. In this fashion, an event matching algorithm may provide a higher throughput of event processing than those utilizing conventional chip multi-processors. Owing to a high computation to communication ratio, utilizing a GPU for an event-matching algorithm enables a CEP system to quickly process large numbers of incoming events for high throughput. Additionally, implementing a GPU for an event matching algorithm is far more economical than multi-core processing or grid computing.

GPUs were developed for conventional computing devices for heavy and complex data processing required in the graphics field. GPUs have evolved into highly parallel, multi-threaded, many-core processors with tremendous computational power and very high memory bandwidth. In recent years, GPUs have been recognized as incredible resources for both graphics and non-graphics processing. GPUs are especially well-equipped to address problems that can be expressed as data-parallel computations (i.e., the same program is executed on many data elements in parallel) with high arithmetic intensity (i.e., the ratio of arithmetic operations to memory operations). Because the same program is executed for each data element with different data, there is a lower requirement for sophisticated flow control than with conventional chip multi-processors. Additionally, because each program is executed on many data elements and has high arithmetic intensity, the memory access latency can be hidden with calculations instead of big data caches as required by conventional chip multi-processors.

Figure 1:
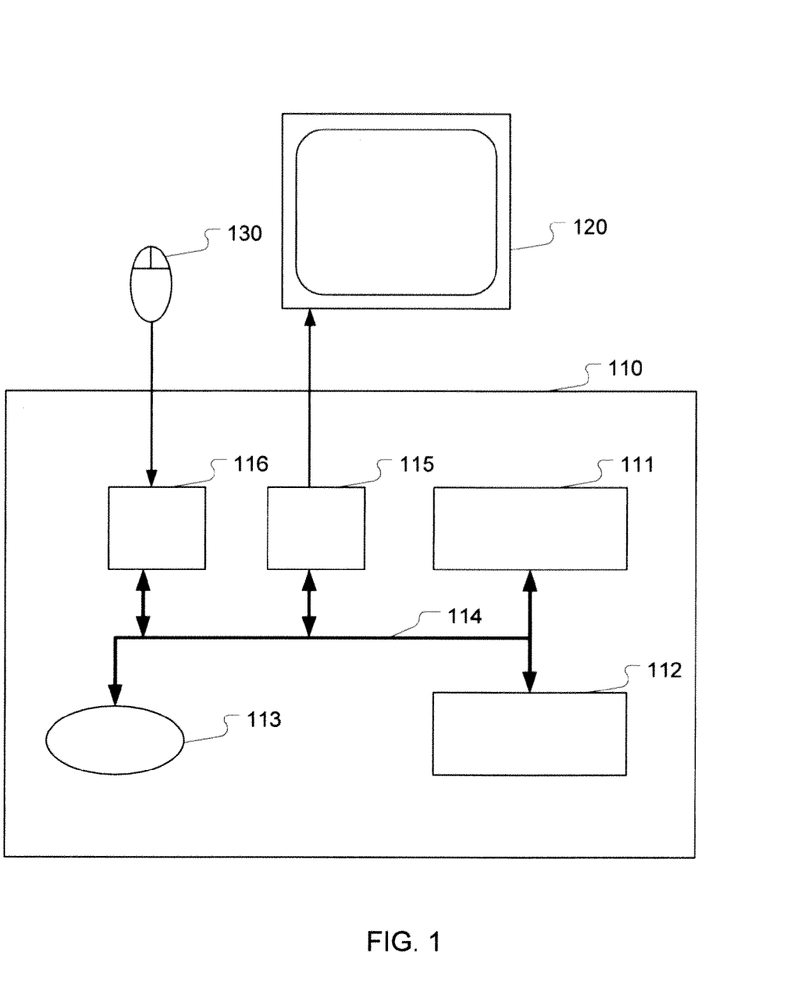
FIG. 1 illustrates an exemplary computing device for implementing a CEP system including a graphical processing unit for performing event-matching.

Event matching in a CEP system may be implemented with software executed on a computing device 110 of FIG. 1. Computing device 110 has one or more processors such as central processing unit ("CPU") 111 designed to process instructions, for example computer readable instructions stored on a storage device 113. By processing instructions, CPU 111 transforms underlying data to process instructions, for example to instruct a GPU 115 to perform event-matching in a CEP system. GPU 115 may be any GPU device that supports general-purpose computing. Storage device 113 may be any type of storage device (e.g., an optical storage device, a magnetic storage device, a solid state storage device, etc.). Alternatively, instructions may be stored in remote storage devices, for example storage devices accessed over a network (e.g., the Internet). Computing device 110 additionally has memory 112, and an input controller 116. A bus 114 operatively couples components of computing device 110, including processor 111, memory 112, storage device 113, input controller 116, GPU 115, and any other devices (e.g., network controllers, sound controllers, etc.). GPU 115 is operatively coupled (e.g., via a wired or wireless connection) to a display device 120 (e.g., a monitor, television, mobile device screen, etc.) in such a fashion that display controller 115 can transform the display on display device 120 (e.g., in response to modules executed). Input controller 116 is operatively coupled (e.g., via a wired or wireless connection) to input device 130 (e.g., mouse, keyboard, touch-pad, scroll-ball, etc.) in such a fashion that input can be received from a user. Computing device 110, display device 120, and input device 130 may be separate devices (e.g., a personal computer connected by wires to a monitor and mouse), may be integrated in a single device (e.g., a mobile device with a touch-screen having a mobile GPU), or any combination of devices (e.g., a computing device operatively coupled to a touch-screen display device, a plurality of computing devices attached to a single display device and input device, etc.).

GPUs typically handle computations only for computer graphics. General-purpose computing on GPUs, however, is the technique of using a GPU to perform computations in an application traditionally handled by a CPU. The highly parallel hardware of a GPU enables a GPU to efficiently compute complex algorithms. Initially, to perform general-purpose computing on a GPU, computations were required to be mapped to graphics application programming interfaces ("APIs"). GPU architectures, for example the Compute Unified Device Architecture ("CUDA") developed by NVIDIA® for use with NVIDIA® GPUs, are hardware and software architectures for issuing and managing computations on the GPU as a data-parallel computing device without the need of mapping computations to a graphics API. GPGPU architectures provide extensions for high-level programming languages (e.g., C), to allow applications to directly utilize the GPU without graphics APIs. Alternative architectures, APIs, and programming languages may be supported, for example OpenCL is an open standard supported by many companies.

Figure 2:
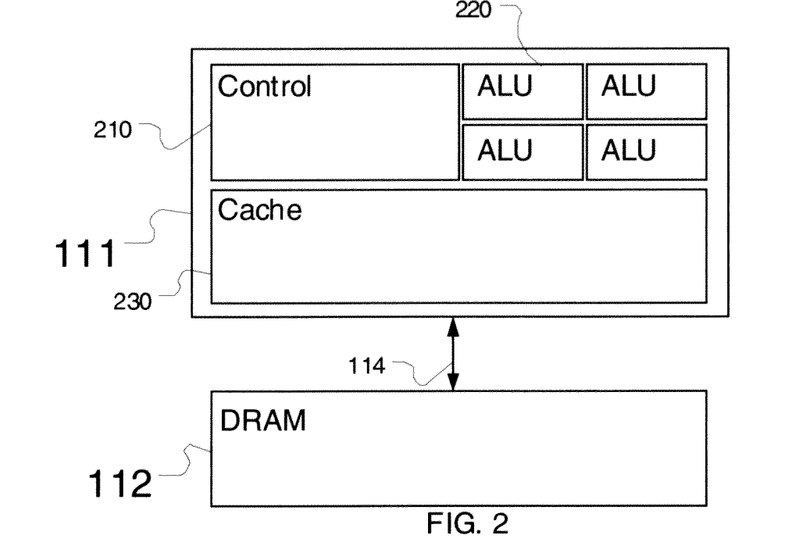
FIG. 2 conceptually illustrates an exemplary conventional central processing unit.
Figure 3:
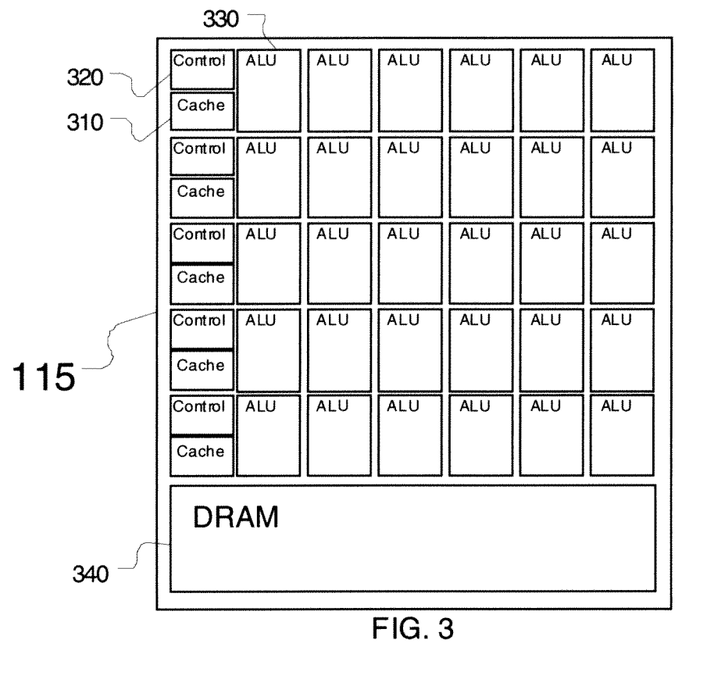
FIG. 3 conceptually illustrates an exemplary graphical processing unit.

Referring again to FIG. 1, for general-purpose computing on GPU 115, GPU 115 runs as a co-processor to CPU 111. GPU 115 may be referred to as a "device" while CPU 111 may be referred to as a "host". Part of an application that can be run many times on independent data can be executed by GPU 115 via many parallel threads that achieve high throughput. For example, FIG. 2 shows a conceptual illustration of a conventional CPU having many transistors devoted to data caching (e.g., cache 230) and flow control (e.g., control device 210) and less transistors devoted to data processing (i.e., few arithmetic logic units ("ALUs") 220). In contrast, FIG. 3 shows a conceptual illustration of a GPU 115 which is designed for highly parallel computation and has more transistors devoted to data processing rather than data caching and flow control. GPU 115 provides for many parallel streams, with multiple control devices 320 and caches 310 and many ALUs 330 operatively coupled (e.g., via high bandwidth bus lines which are not shown) to DRAM 340. For example, a GPU made by NVIDIA® may have 240 cores on a single chip and greater than 100 GB/sec bandwidth between the chip and the graphics memory. Such a GPU may process event-matching at 50-100 times the speed of a single core CPU. Such a GPU may even process event-matching at 10 times the speed of two quad-core INTEL® XEON® processors. GPUs additionally may provide about 10 times the improvement according to a price versus processing performance ratio and are energy efficient.

Figure 4:
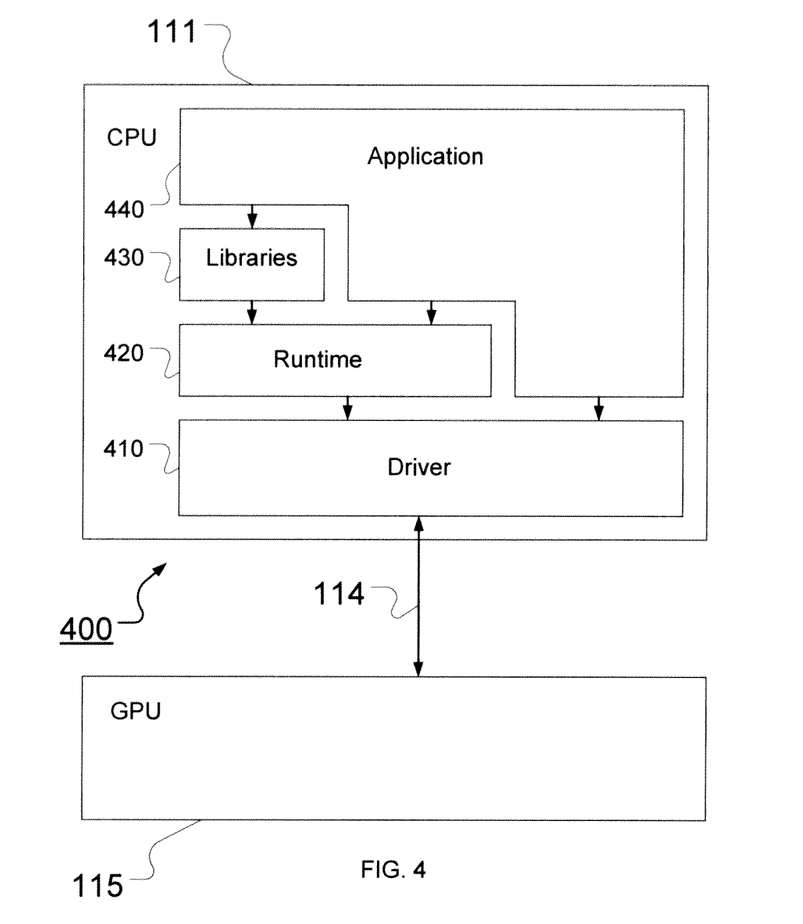
FIG. 4 illustrates a general purpose graphical processing unit software stack for allowing a central processing unit to issue and manage computations on a graphical processing unit.

FIG. 4 illustrates a GPU software stack 400 for allowing a CPU 111 to issue and manage computations on GPU 115 as a data-parallel computing device. Parts of applications that can be run many times on independent data can be executed on GPU 115 via many parallel threads to achieve high throughput. The GPGPU software stack 400 may include a hardware driver 410, an API and its runtime 420, and high level mathematical libraries 430 and application 440. High level mathematical libraries 430 may include common mathematical functions, such as arithmetic and/or Boolean functions, useful for performing event-matching in CEP systems.

The component of the program that is off-loaded from CPU 111 onto GPU 115 is the kernel. The kernel is the portion of an application that is executed many times, but independently on different data. The kernel can be isolated into a function that is executed in parallel on GPU 115 as many different threads. To that effect, such a function is compiled to the instruction set of CPU 111 and the resulting program, the kernel, is downloaded to GPU 115. Both CPU 111 and GPU 115 may maintain their own DRAM. Data may then be copied from one DRAM to the other through optimized API calls that utilize a high-performance Direct Memory Access ("DMA") engine of GPU 115.

Figure 5:
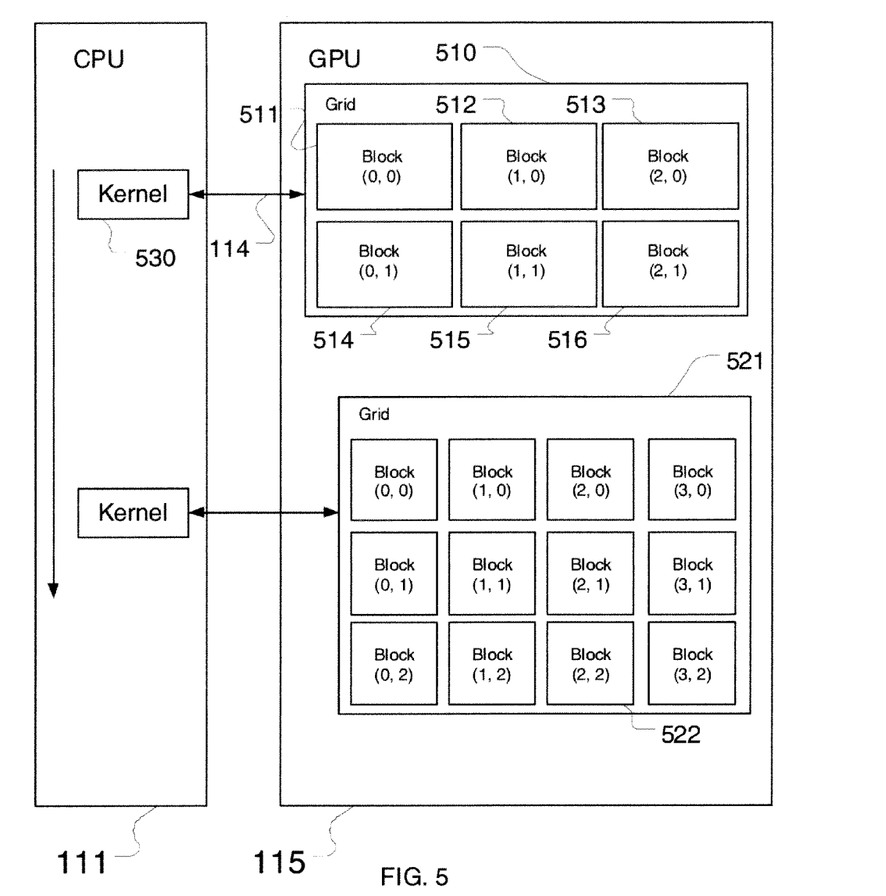
FIG. 5 illustrates an exemplary central processing unit operatively coupled to a graphical processing unit.

FIG. 5 illustrates a kernel 530 executed by CPU 111. Both GPU 115 and CPU 111 have their own DRAM. CPU 111 has memory 112 as shown in FIG. 1. GPU 115 has DRAM 340 (shown in FIG. 3). When kernel 530 is executed on CPU 111, APIs can copy data in either direction between memory 112 and DRAM 340, for example via a high bandwidth bus line or by utilizing a DMA engine.

Figure 6:
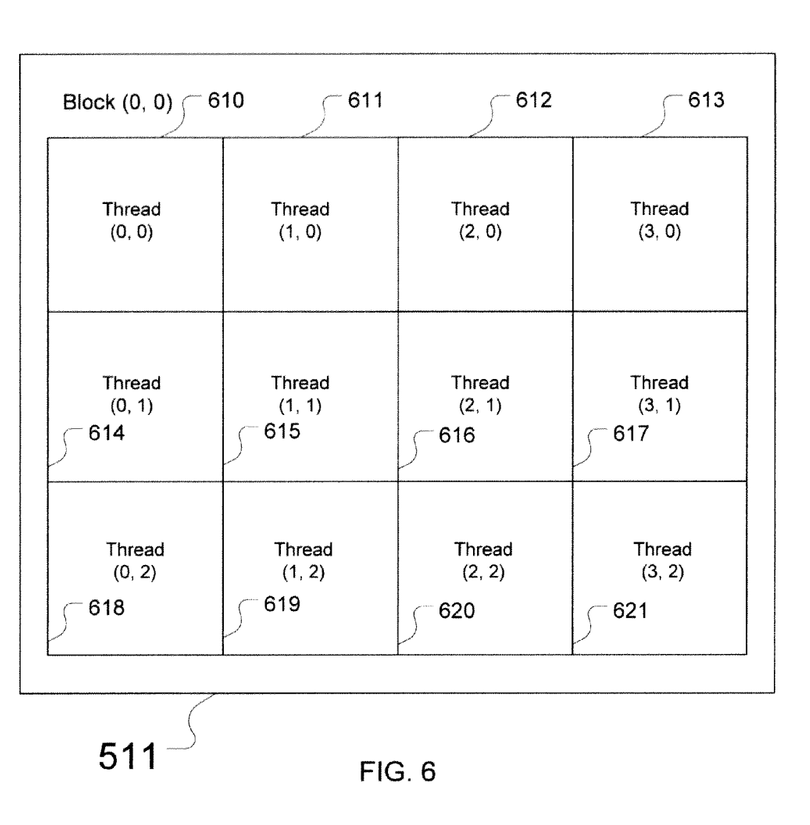
FIG. 6 illustrates an exemplary batch of threads comprising a thread block.

Referring to FIG. 6, the batch of threads, such as threads 610-621, that execute kernel 530 is organized as a grid 511 of thread blocks, such as thread blocks 511-516. The threads (e.g., threads 610-621) making up each block (e.g., block 511) cooperate together by efficiently sharing data through some fast shared memory (e.g., shared memory 720, shown in FIG. 7). Threads may synchronize their execution to coordinate memory access. Kernel 530 may specify synchronization points, thereby suspending selected ones of threads 610-621 until each thread 610-621 reaches a synchronization point.

Each thread is associated with a unique thread ID, local to a block. An application may specify a block as a two- or three-dimensional array of arbitrary size and identify each thread using a two- or three-component index. For a two-dimensional block of size $(D_x, D_y)$, the thread ID of a thread of index (x, y) may be $(x+y D_x)$ and for a three-dimensional array, the thread ID of a thread of index (x, y, z) may be $(x+y D_x+z D_x D_y)$.

Each block (e.g., block 511) may contain a limited number of threads depending on the hardware. Blocks having the same dimensions (i.e., the same number of threads) may be batched together to form a grid of blocks. As shown in FIG. 5, blocks 511-516 having the same dimensions (i.e., the same number of threads) are batched together to form grid 510. In like fashion, blocks 522 of a second dimension are batched together to form grid 521. By batching blocks of the same dimensions together, the total number of threads that can be launched in a single kernel invocation is increased. Thus, threads within the same grid may communicate and synchronize with each other.

Figure 7:
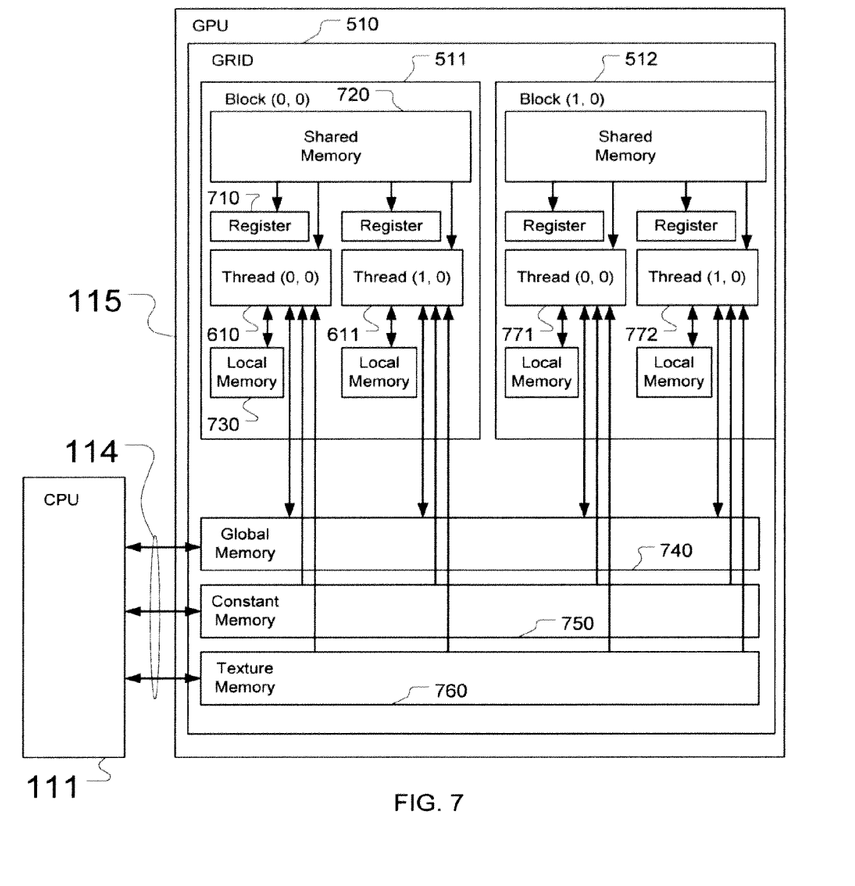
FIG. 7 illustrates an exemplary graphical processing unit thread's access to memory spaces of various scopes.

FIG. 7 shows a conceptual illustration of CPU 111 operatively coupled to GPU 115 via bus 114. GPU 115 may include one or more grids, for example grid 510. Each grid may include one or more thread blocks, for example grid 510 includes blocks 511 and 512. Each thread block may include one or more threads, for example block 511 includes threads 610 and 611.

FIG. 7 also conceptually shows how each thread has access to GPU 115's DRAM and on-chip memory through a set of memory spaces of various scopes. Each of the threads 610, 611, 771 and 772 has private local memory, for example thread 610 has local memory 730 that only thread 610 may utilize (i.e., thread 611 cannot read or write to local memory 730). Each thread also has a 32-bit register, for example register 710. Each of the threads 610, 611, 771 and 772 block has shared memory visible to all threads of the block, for example block 511 has shared memory 720 that threads 610 and 611 can read from and write to but threads outside block 511, such as thread 771, cannot read or write to shared memory 720. GPU 115 also includes global memory 740 which every thread may read or write to, constant memory 750 which every thread may read from, and texture memory 760 which every thread may read from. The shared memory and registers, as well as a read-only constant cache (not shown) and a read-only texture cache (not shown) may be on-chip memory. The local and global memory spaces may be implemented as read-write regions of GPU memory that are not cached (e.g., read-write regions of DRAM 340 shown in FIG. 3). The constant memory 750 and texture memory 760 spaces may be implemented as read-only regions of GPU memory (e.g., read-only regions of DRAM 340 shown in FIG. 3).

Embodiments of methods and systems for implementing event matching on a GPU may be selectively chosen depending on a number of events to be processed.

Embodiments may process multiple events per thread (i.e., inter task parallelism), thereby providing a high throughput for processing many parallel events. By allowing threads to work independently on separate events, the total matching time and throughput are increased. Such embodiments may be implemented in systems receiving event data at a rate of GB/sec. In these embodiments, each thread in GPU 115 may be assigned a group of events and execute an event matching algorithm. In a first phase of this embodiment, every thread (e.g., thread 610) may pick up an event and compute a bit vector and store it in the thread's local memory (e.g., local memory 730). For every event attribute, the algorithm may hash the attribute name to determine the table holding the attribute and the resulting table may be accessed. Entries of the table matched by the attribute may then be indexed and corresponding bits in the bit vector may be set to 1. In a second phase of these embodiments, the thread traverses an access predicate list and each access predicate is evaluated against the bit vector. The thread then saves the matches. When an access predicate matches a corresponding bit vector (i.e., the corresponding bit vector position is set to 1), each set of methods is evaluated.

The following pseudo code may be useful for implementing such embodiments:

Step 1: Load an Event List E(i) in a GPU's global memory (e.g., by using the CUDA function cudamemcpy( )).

Step 2: For each thread, load one Event Data E {A, V} pair and the access predicate list in the thread's local memory.

Step 3: Initialize a bit vector the size of the number of predicates in the access predicate list (Number_of_Predicates (N)) to 0 in the thread's local memory.

Step 4: In each thread, execute the event matching algorithm.

Phase 1: Generate a bit vector of corresponding predicates.

Phase 2: Traverse the access predicate list and for each access predicate compute the final result of a Boolean function (e.g., a comparative function) whether a match is found.

Step 5: Iterate through all events in the Event List.

Other embodiments may process a single event per thread or block of threads (i.e., intra task parallelism). Thus, by multiple threads working collaboratively on a single event, the processing time for that event may be reduced. In these embodiments, each thread in GPU 115 may be assigned a group of predicates and execute an event matching algorithm to evaluate matches with the event. Each thread may set corresponding bits in a bit vector stored in the thread's local memory (e.g., local memory 730) to 1 to indicate a match. After all threads have executed the event matching algorithm, the bit vectors in each thread's local memory are merged into a global bit vector stored in a GPU's global memory (e.g., global memory 740). The access predicate list is then split into chunks across the threads and each thread evaluates the chunk of access predicates against the bit vector and saves the matches.

The following pseudo code may be useful for implementing such embodiments:

Step 1: Load the Event List E(i) in a GPU's global memory.

Step 2: Allocate either a warp of threads (16 threads) or a block of threads (e.g., a number of threads≤512) per event.

Step 3: Load the Event Data E {A, V} and access predicate list in the warp or block of thread's shared memory (e.g., shared memory 720) or in the GPU's global memory (e.g., global memory 740) and initialize a bit vector in the warp or block of threads to 0.

Step 4: In each thread in the warp or block of threads, receive a group of predicates and compute the result of a Boolean function to determine whether a match is found and set corresponding partial bit vectors in the thread's local memory (e.g., local memory 730).

Step 5: Synchronize threads until all remaining threads fill their respective partial bit vectors. Upon synchronization, merge each thread's partial bit vector to form a global bit vector in global memory (e.g., memory 740).

Step 6: Split the access predicate into chunks across different threads and compute for each thread whether a match is found.

Of course, while multiple embodiments are disclosed, one of ordinary skill in the art understands that variations or combinations of these embodiments may be implemented as well. For example, a hybrid technique may combine the embodiments to provide flexibility of reducing the matching time of a single event or increasing overall throughput.

According to embodiments, grid dimensions, for example dimensions of grid 510 shown in FIG. 5, may be selected to substantially utilize maximum GPU resources at all times (i.e., to keep the GPU busy). For example, for a grid having dimensions X blocks long and Y blocks wide, X and Y may be chosen both so that X*Y can handle the average number of events entering the CEP system but also to utilizes substantially all, or at least a significant amount of, GPU resources. For example, in a CEP system receiving an average number of events N, the number of blocks in a grid may be chosen to satisfy the relation X*Y≤N.

While this disclosure generally refers to a GPU having DRAM, one of ordinary skill in the art understands that the GPU and DRAM may not be integrated within a single chip. One or more memory chips may be physically separate from the GPU and operatively coupled thereto, for example via a high-bandwidth bus line.

The invention has been described through embodiments. However, various modifications can be made without departing from the scope of the invention as defined by the appended claims and legal equivalents.

What is claimed is:

1. A method for event matching in a complex event processing system, the method comprising:
    obtaining, by a graphical processing unit of an event matching computing device, one or more current events, and assigning two or more threads of the graphical processing unit to the obtained one or more current events, wherein the two or more threads share a common cache, the one or more current events comprising one or more attributes;
    identifying, by the graphical processing unit, one or more existing events corresponding to the obtained one or more current events; and
    allocating, by the graphical processing, the identified one or more existing events to the assigned two or more threads based on a correspondence between the identified one or more existing events and the obtained one or more current events, wherein the correspondence between the identified one or more existing events and the obtained one or more current events comprises a match between one or more current event attributes associated with the obtained one or more current events and one or more existing event attributes associated with the one or more existing events and wherein each of the assigned two or more threads executes at least one of the obtained one or more current events and the corresponding identified at least one existing event.

2. The method as set forth in claim 1 wherein the identifying further comprises:
    identifying, by the graphical processing unit, one or more tables with one or more stored attributes exactly matching the one or more attributes in the each of the obtained one or more events by hashing the one or more attributes;
    creating, by the graphical processing unit, a bit vector for each of the identified one or more tables exactly matching the one or more attributes; and
    storing, by the graphical processing unit, an index in the created bit vector indicating the exact match.

3. The method as set forth in claim 2 further comprising merging, by the graphical processing unit, the created bit vector for each of the identified one or more tables into a single bit vector.

4. The method as set forth in claim 2 further comprising:
    obtaining, by the graphical processing unit, a stored access predicate list comprising the one or more existing events; and
    identifying, by the graphical processing unit, for one or more exact matches between the one or more existing events with one or more bit vector contents by comparing the one or more existing events against the one or more bit vector contents.

5. The method as set forth in claim 4 further comprising allocating, by the event matching computing device, the assigned two or more threads to the one or more existing events associated with the identified one or more matches.

6. A non-transitory computer readable medium having stored thereon instructions for event matching in a complex event processing system comprising machine executable code which when executed by at least one graphical processing unit, causes the graphical processing unit to perform steps comprising:
    obtaining one or more current events, and assigning two or more threads of the graphical processing unit to the obtained one or more current events, wherein the two or more threads share a cache, the one or more current events comprising one or more attributes;
    identifying one or more existing events corresponding to the obtained one or more current events; and
    allocating the identified one or more existing events to the assigned two or more threads based on a correspondence between the identified one or more existing events and the obtained one or more current events, wherein the correspondence between the identified one or more existing events and the obtained one or more current events comprises a match between one or more current event attributes associated with the obtained one or more current events and one or more existing event attributes associated with the one or more existing events and wherein each of the assigned two or more threads executes at least one of the obtained one or more current events and the corresponding identified at least one existing event.

7. The medium as set forth in claim 6 wherein the identifying further comprises:
   identifying one or more tables with one or more stored attributes exactly matching the one or more attributes in the each of the obtained one or more events by hashing the one or more attributes;
   creating a bit vector for each of the identified one or more tables exactly matching the one or more attributes; and
   storing an index in the created bit vector indicating the exact match.

8. The medium as set forth in claim 7 further comprising merging the created bit vector for each of the identified one or more tables into a single bit vector.

9. The medium as set forth in claim 6 further comprising:
   obtaining a stored access predicate list comprising the one or more existing events; and
   identifying for one or more exact matches between the one or more existing events with one or more bit vector contents by comparing the one or more existing events against the one or more bit vector contents.

10. The medium as set forth in claim 9 further comprising allocating the assigned two or more threads to the one or more existing events associated with the identified one or more matches.

11. An event matching computing device comprising:
   a graphical processing unit and a memory coupled to the graphical processing unit which is configured to be capable of executing programmed instructions comprising and stored in the memory to:
      obtain one or more current events, and assigning two or more threads of the graphical processing unit to the obtained one or more current events, wherein the two or more threads share a cache, the one or more current events comprising one or more attributes;
      identify one or more existing events corresponding to the obtained one or more current events; and
      allocate the identified one or more existing events to the assigned two or more threads based on a correspondence between the identified one or more existing events and the obtained one or more current events, wherein the correspondence between the identified one or more existing events and the obtained one or more current events comprises a match between one or more current event attributes associated with the obtained one or more current events and one or more existing event attributes associated with the one or more existing events and wherein each of the assigned two or more threads executes at least one of the obtained one or more current events and the corresponding identified at least one existing event.

12. The device as set forth in claim 11 wherein the graphical processing unit is further configured to be capable of executing programmed instructions stored in the memory comprising and stored in the memory for the identifying to:
   identify one or more tables with one or more stored attributes exactly matching the one or more attributes in the each of the obtained one or more events by hashing the one or more attributes;
   create a bit vector for each of the identified one or more tables exactly matching the one or more attributes; and
   store an index in the created bit vector indicating the exact match.

13. The device as set forth in claim 12 wherein the graphical processing unit is further configured to be capable of executing execute programmed instructions stored in the memory comprising and stored in the memory to:
   merge the created bit vector for each of the identified one or more tables into a single bit vector.

14. The device as set forth in claim 12 wherein the graphical processing unit is further configured to be capable of executing execute programmed instructions stored in the memory comprising and stored in the memory to:
   obtain a stored access predicate list comprising the one or more existing events; and
   identify for one or more exact matches between the one or more existing events with one or more bit vector contents by comparing the one or more existing events against the one or more bit vector contents.

15. The device as set forth in claim 14 wherein the graphical processing unit is further configured to be capable of executing execute programmed instructions stored in the memory comprising and stored in the memory to:
   allocate the assigned two or more threads to the one or more existing events associated with the identified one or more matches.

* * * * *